US008228557B2

(12) United States Patent
Iinuma

(10) Patent No.: US 8,228,557 B2
(45) Date of Patent: Jul. 24, 2012

(54) IMAGE PROCESSING APPARATUS AND IMAGE PROCESSING METHOD

(75) Inventor: Osamu Iinuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 12/429,536

(22) Filed: Apr. 24, 2009

(65) Prior Publication Data

US 2009/0268216 A1 Oct. 29, 2009

(30) Foreign Application Priority Data

Apr. 25, 2008 (JP) ................................ 2008-115736

(51) Int. Cl.
*G06K 1/00* (2006.01)

(52) U.S. Cl. ........... 358/1.9; 358/1.4; 358/518; 358/522

(58) Field of Classification Search ................... 358/1.9, 358/1.4, 518, 522, 533
See application file for complete search history.

(56) References Cited

U.S. PATENT DOCUMENTS 7,245,843 B2 * 7/2007 Bessho .......................... 399/49

FOREIGN PATENT DOCUMENTS

JP 2007-011028 A 1/2007

* cited by examiner

*Primary Examiner* — Houshang Safaipour
(74) *Attorney, Agent, or Firm* — Canon U.S.A., Inc., IP Division

(57) ABSTRACT

An image processing apparatus includes an allowable-amount-of-special-toner determining unit for determining an allowable amount of special toner from a total adhesion amount of toner of four colors including cyan, magenta, yellow, and black on an input image, a normal print-out unit for performing a normal print-out process, a two-path print-out unit for performing a two-path print-out process, a grouping unit for grouping pixels for which printing with the special toner is set into a first pixel group and a second pixel group based on the allowable amount of special toner; and a print-out-method selecting unit for selecting the normal print-out unit or the two-path print-out unit based on a percentage of the number of first-group pixels to the number of pixels for which printing with the special toner is set.

21 Claims, 16 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method that use special toner.

2. Description of the Related Art

In recent years, digital printing technologies have been enhancing their utility values in the on-demand printing market and the market for the printing of small numbers of documents.

In particular, full-color printing using electrophotography has taken precedence over other printing technologies in terms of its productivity, printing cost, and ease of maintenance, and is rapidly gaining market share.

Not only full-color printing by electrophotography using toner of four colors including cyan (C), magenta (M), yellow (Y), and black (Bk), but also multi-color printing using special toner has been getting a lot of attention.

The special printing market having a higher on-demand performance and immediacy is brought into view by the technologies concerning full-color printing using electrophotography.

Special toner may be exemplified by transparent toner that accommodates the irregularity of the surfaces of print materials to realize good gloss, and light toner that is capable of suppressing the roughness of highlighted parts.

The use of the special toner provides a new added benefit different from the benefits achieved in normal digital printing to further enhance the world of the digital printing.

Printing with the special toner may have the drawback of increasing the total amount of toner used in printing, as compared with the four-color printing used in the related art.

In particular, when the special toner is applied in color printing by the electrophotography, the special toner image generated on an intermediate transfer body is typically transferred along with the C, M, Y, and K toner images to a sheet of paper.

The increase in the total amount of toner in each electrophotographic process can thus place a heavier load on the process.

A method of calculating the amount of printed special toner from the amount of toner of the C, M, Y, and K colors is disclosed in Japanese Patent Laid-Open No. 2007-011028.

However, the amount of printed special toner can be zero in the calculation of the amount of printed special toner in the manner disclosed in Japanese Unexamined Patent Application Publication No. 2007-011028. For example, this can happen in a case where the total amount of toner of the C, M, Y, and K colors exceeds a total amount of toner allowed in the print apparatus.

In such a case, it may not be possible to achieve the intended visual effect of the special toner even if a user has performed the printing with the special toner.

SUMMARY OF THE INVENTION

According to an embodiment of the invention, an image processing apparatus is provided that includes an allowable-amount-of-special-toner determining unit configured to determine an allowable amount of special toner from a total adhesion amount of toner of four colors including cyan, magenta, yellow, and black on an input image, the total adhesion amount of toner of four colors being calculated in formation of an image, a normal print-out unit configured to perform a normal print-out process in which the toner of the four colors including cyan, magenta, yellow and black and the special toner are adhered and fused, and a two-path print-out unit configured to perform a two-path print-out process in which the special toner is adhered and fused after the toner of the four colors including cyan, magenta, yellow and black is adhered and fused. The image processing apparatus also includes a grouping unit configured to group pixels for which printing with the special toner is set into a first pixel group and a second pixel group based on the allowable amount of special toner determined by the allowable-amount-of-special-toner determining unit, and a print-out-method selecting unit configured to select the normal print-out unit or the two-path print-out unit based on a percentage of the number of pixels grouped into the first pixel group by the grouping unit to the number of pixels for which printing with the special toner is set.

Further features of the present invention will become apparent from the following description of exemplary embodiments with reference to the attached drawings.

DESCRIPTION OF THE EMBODIMENTS

Although transparent toner is used as an example of special toner in the following exemplary embodiments, special toner other than the transparent toner may also be used. The transparent toner (transparent recording material) is characterized by the generation of a transparent and colorless image therewith. Also, the special toner, such as transparent toner, may be understood to be "secondary toner," whereas toner of four colors including cyan, magenta, yellow, and black may be understood to be "primary toner." Furthermore, a print-out process in which toner of the four colors including cyan, magenta, yellow and black and the special toner are adhered and fused may be referred to as a "normal" or "one-path" print-out process, whereas a print-out process in which the special toner is adhered and fused after toner of the four colors including cyan, magenta, yellow and black is adhered and fused may be referred to as a "two-path" print-out process.

A first exemplary embodiment of the present invention will be described herein with reference to the attached drawings. In addition, an example of a method of determining how to perform the printing with the special toner will be described herein.

A "user interface" in this specification indicates both the monitor of a local personal computer (PC) 102 and a display unit 303 in a multifunction peripheral (MFP).

Figure 1:
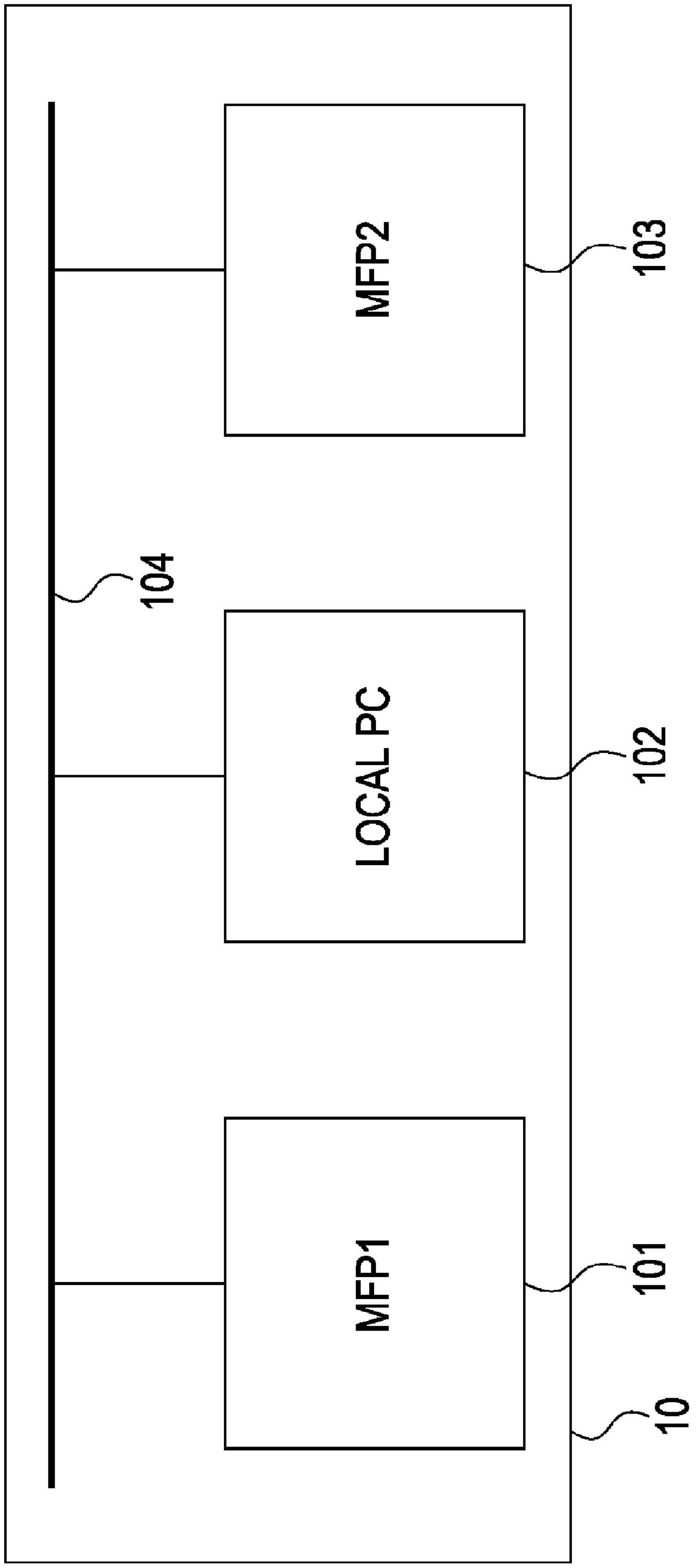
FIG. 1 is a block diagram illustrating an image processing system according to an embodiment of the present invention.

FIG. 1 is a block diagram illustrating an example of image processing system according to an embodiment of the present invention.

Referring to the example shown in FIG. 1, MFPs 101 and 103 serving as recording apparatuses and the local PC 102 are connected to a local area network (LAN) 104 built in an office 10. The MFPs 101 and 103 each perform image processing on an input image read out from a document. The result of the image processing is printed by the MFP that has read out the document image.

Alternatively, after the MFP 101 performs the image processing on a document image read out by the MFP 101, the MFP 103 may print the document image. Furthermore, the MFP 101 or 103 may interpret data that is described in a page description language (PDL) and that is transmitted from the local PC 102 and may print an image of the data.

Figure 2:
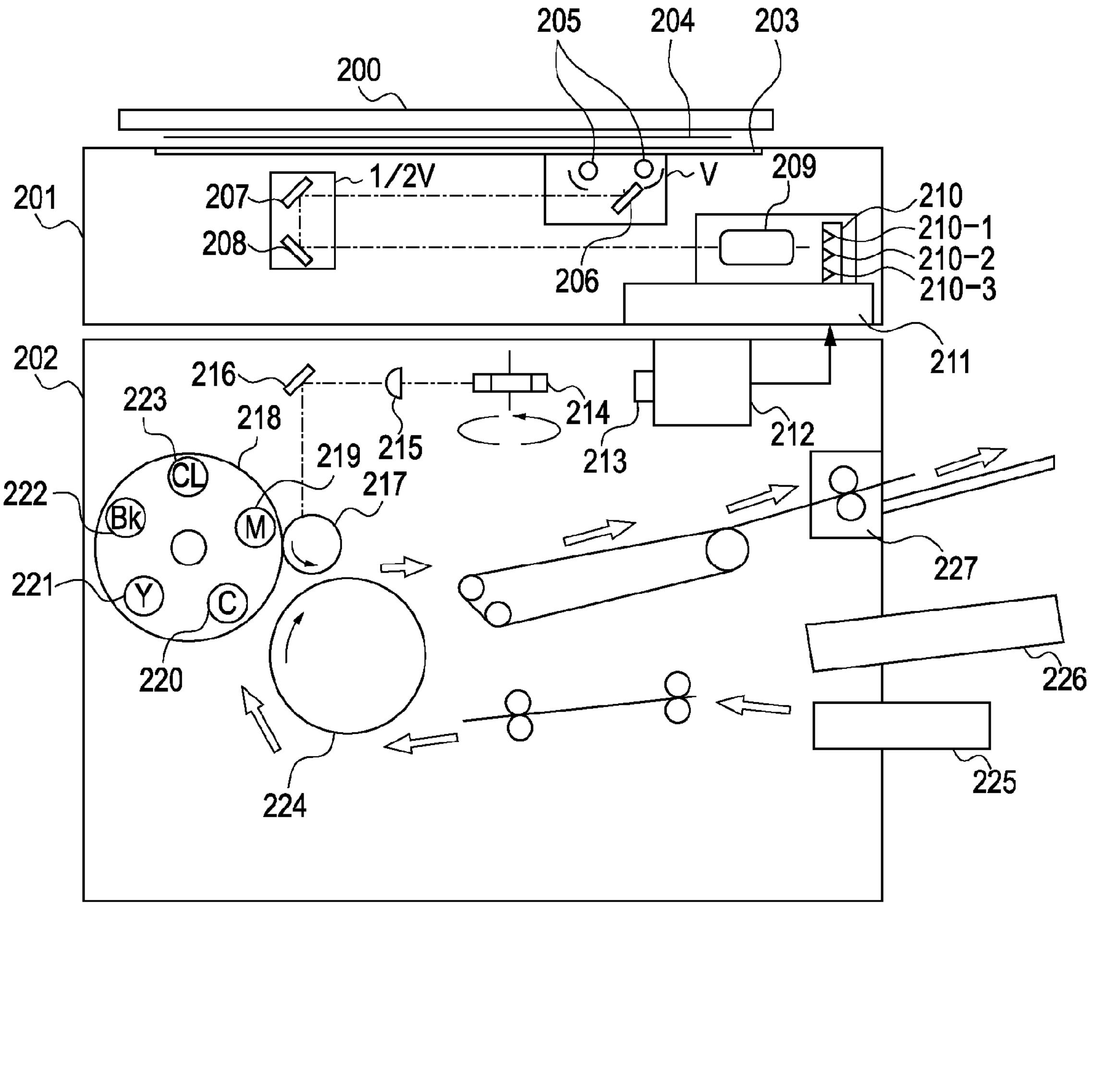
FIG. 2 is a diagram illustrating an example of an MFP according to an embodiment of the invention.
Figure 3:
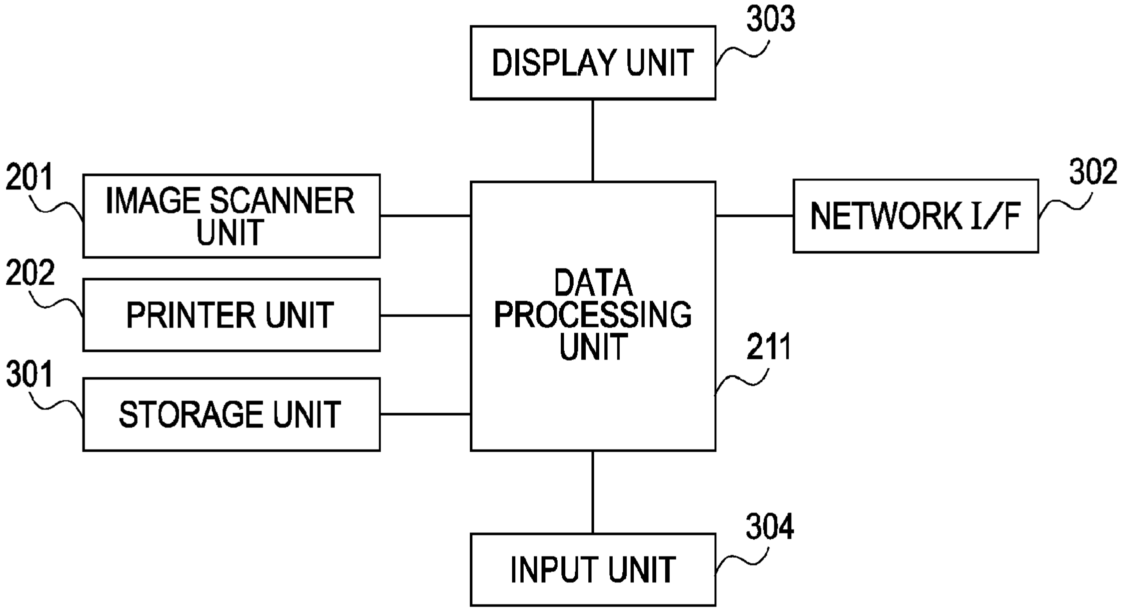
FIG. 3 is another diagram illustrating the MFP.

FIGS. 2 and 3 illustrate an example of the MFP 101. The MFP 103 has the same configuration as that of the MFP 101.

Referring to the example shown in FIG. 2, an image scanner unit 201 reads out a document image and performs digital signal processing on the readout document image. A printer unit 202 serving as an image processing apparatus prints a full-color image corresponding to the document image read out by the image scanner unit 201 on a sheet of paper.

The image scanner unit 201 includes a mirror pressure plate 200. A document 204 put between the mirror pressure plate 200 and a document table glass (hereinafter referred to as a platen) 203 is irradiated with light emitted from lamps 205 and is fed to mirrors 206, 207, and 208.

A lens 209 focuses the light to form an image on a three-line solid-state image pickup sensor (hereinafter referred to as a charge coupled device (CCD)) 210. At this time, three image signals including a red (R) image signal 210-1, a green (G) image signal 210-2, and a blue (B) image signal 210-3, which correspond to full-color information, are supplied to a data processing unit 211.

The entire surface of the document may be scanned (secondary scanning) by mechanical movement of the lamps 205 and the mirror 206 at a speed v and mechanical movement of the mirrors 207 and 208 at a speed ½v in the direction orthogonal to the electrical scanning (main scanning) direction of a line sensor. The document 204 may be read out at a resolution of 600 dots/inch (dpi) in both the main scanning and the secondary scanning. The readout image can be stored in a data storage portion in the data processing unit 211 in pages of the document.

The data processing unit 211 electrically processes each image signal stored therein in units of pixels, separates the image signal into magenta (M), cyan (C), yellow (Y), and black (Bk) components, and supplies the components resulting from the separation to the printer unit 202. In addition, the data processing unit 211 may be capable of generating image data of the special toner, for example, transparent image data (CL) in units of pixels and supplying the image data to the printer unit 202.

In the embodiment as shown, the magenta (M), cyan (C), yellow (Y), and black (Bk) image signals are supplied to a laser driver 212. The laser driver 212 modulates and drives a semiconductor laser 213 in response to the supplied image signals. The laser light passes through a polygon mirror 214, an f-θ lens 215, and a mirror 216 and a photosensitive drum 217 is scanned with the light. The data may be written at a resolution of 600 dpi in both the main scanning and the secondary scanning, as in the reading.

A rotating developing unit 218 includes a magenta developing portion 219, a cyan developing portion 220, a yellow developing portion 221, a black developing portion 222, and a clear (transparent) developing portion 223. These five developing portions 219 to 223 are alternately in contact with the photosensitive drum 217 to develop an electrostatic latent image formed on the photosensitive drum 217 with the toner of each color.

A sheet of paper fed from a sheet cassette 225 or a sheet cassette 226 is wound around a transfer drum 224 and the image developed on the photosensitive drum 217 is transferred to the sheet of paper.

After the images of the five colors including magenta (M), cyan (C), yellow (Y), black (Bk), and clear (CL) are sequentially transferred to the sheet of paper, the sheet of paper passes through a fusing unit 227 where the toner of the five colors are fixed on the sheet of paper, and the sheet of paper is ejected from the printer unit 202.

The printed sheet of paper may be subjected to the adhesion of toner and the fusing, without being ejected from the image processing apparatus, to print images on the printed sheet of paper and, then, may be ejected from the image processing apparatus.

Referring to FIG. 3, the MFP 101 as illustrated therein includes a network interface 302 used for connection to the LAN 104. The MFP 101 is capable of recording PDL data transmitted from the local PC 102 or another general-purpose PC through a driver in a storage unit 301. The PDL data transmitted from the local PC 102 through the driver can be interpreted and processed by the data processing unit 211 through the LAN 104 and the network interface 302 to be converted into a recordable signal. The recordable signal may be recorded on a recording sheet in the MFP 101 as a recording image.

The storage unit 301 has a function for storing data resulting from rendering of data supplied from the image scanner unit 201 or PDL data transmitted from the local PC 102 through the driver.

The MFP 101 is operated with a key operation unit (i.e., an input unit 304) provided in the MFP 101. The data processing unit 211 performs certain control with a controller provided therein in response to the operation with the input unit 304.

The MFP 101 includes the display unit 303 that is capable of displaying the state of an input operation and image data to be processed.

The MFP 103 also includes the display unit 303 that is capable of displaying the state of an input operation and image data to be processed.

Figure 4:
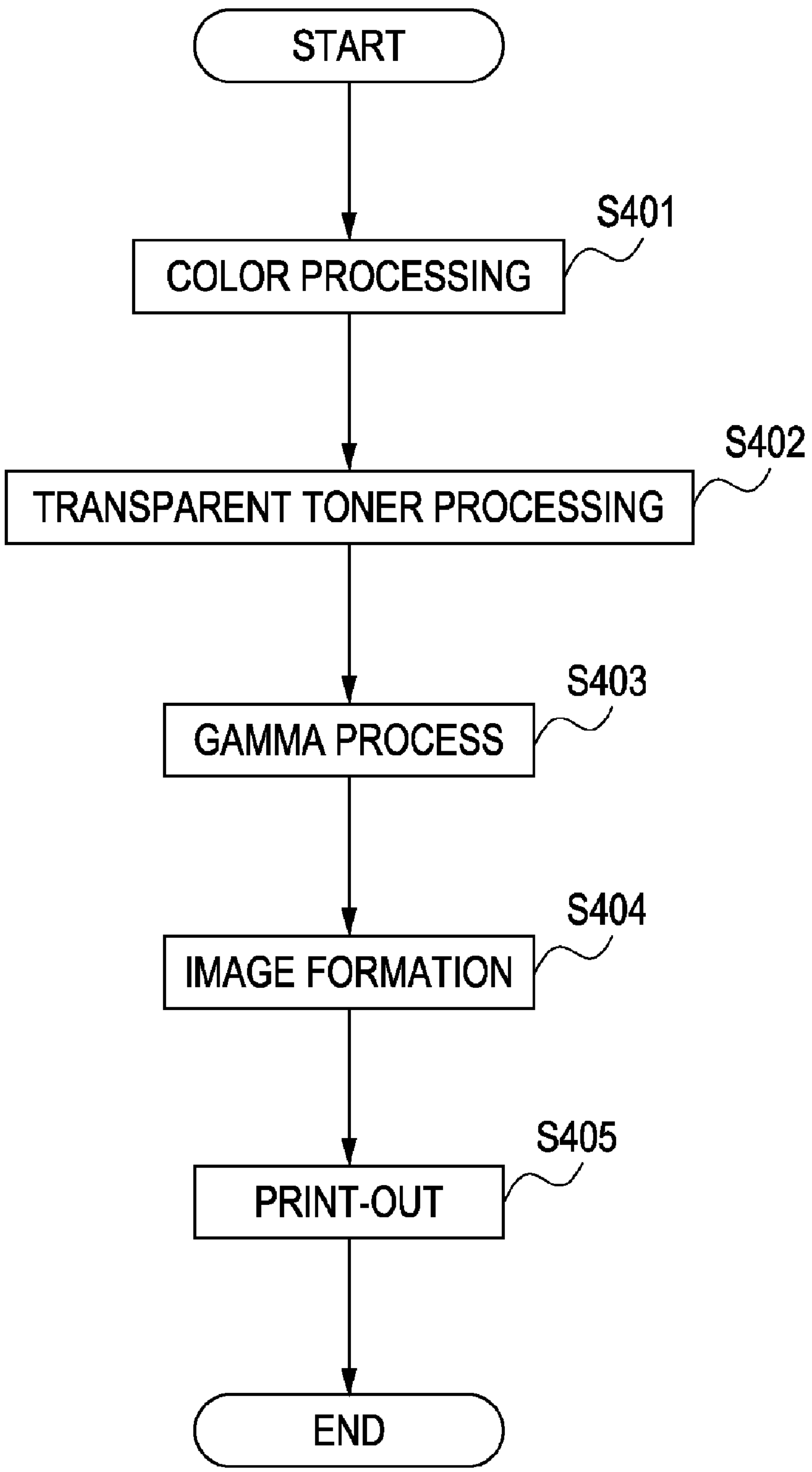
FIG. 4 is a flowchart illustrating an example of image processing in a normal print-out process using transparent toner.
Figure 5:
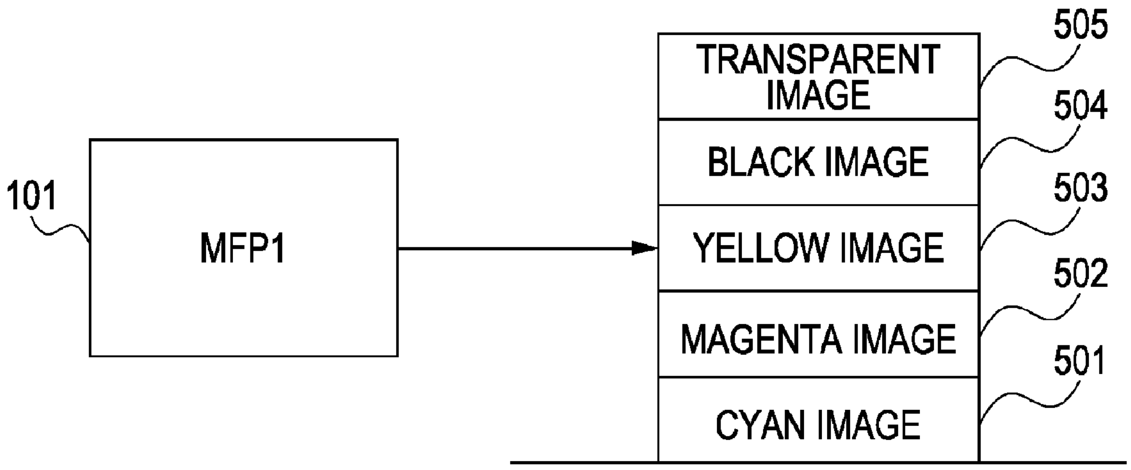
FIG. 5 schematically illustrates an example of how toner can be adhered in the normal print-out process.

FIG. 4 is a flowchart illustrating an example of image processing in a normal print-out process in the data processing unit 211. FIG. 5 schematically illustrates an example of how to generate a printout when the transparent toner is used.

The MFP 101 sequentially performs printing of a cyan image 501, a magenta image 502, a yellow image 503, a black image 504, and a transparent image 505 to output the printed sheet. The example of the process shown in the flowchart in FIG. 4 may be performed by a central processing unit (CPU) provided in the image processing apparatus according to the embodiment of the present invention.

Referring to FIG. 4, in Step S401, the CPU converts an RGB signal transmitted from the local PC 102 or the MFP 101 or 103 into a CMYK signal in color processing. The conversion into a CMYK signal may be performed by, for example, a matrix operation as shown in Equation (1):

$$\begin{pmatrix} C \\ M \\ Y \\ K \end{pmatrix} = \begin{pmatrix} A1 & A2 & A3 \\ A4 & A5 & A6 \\ A7 & A8 & A9 \\ A10 & A11 & A12 \end{pmatrix} \begin{pmatrix} R \\ G \\ B \end{pmatrix} \quad (1)$$

When a CMYK signal is transmitted from the local PC 102, the CPU may also perform density adjustments, etc., to the transmitted CMYK signal in Step S401.

In Step S402, the CPU determines the amount of transparent toner from the CMYK signal.

First, the CPU calculates the total amount of toner of C, M, Y, and K colors for every pixel. The total amount of toner means the amount of toner that corresponds to the total volume of C, M, Y, and K signals and that is transferred to a sheet of paper in units of pixels.

The total amount of toner is normally represented by a percentage where the maximum value of a simple color is equal to 100%.

Since the maximum value of the amount of toner of a single color is "255" when an image signal is represented by an 8-bit integer, the value resulting from addition of the amounts of toner of C, M, Y, and K is multiplied by 100/255 to calculate the total amount of toner.

For example, when the amounts of toner of the respective colors for a certain pixel in an 8-bit image signal are equal to:

C=80, M=95, Y=140, and K=100, the total adhesion amount of toner of the five colors is equal to 425 (C+M+Y+K=425). Accordingly, the total amount of toner is calculated according to Equation (2):

$$\text{The total amount of toner}=(C+M+Y+K)\times 100/255=167 \quad (2)$$

The upper limit of the total amount of toner is generally determined by, for example, the imaging process and is normally equal to 200% to 280%. According to aspects of the present embodiment, the total amount of toner after the transparent toner layer is generated should not exceed the upper limit.

When it is assumed that the upper limit of the total amount of toner is 240%, the difference between the value calculated according to Equation (2) and the upper limit corresponds to a density ratio allowable to the transparent toner layer. Specifically, $$\text{The allowable amount of transparent toner}=240-167 \; 73\% \quad (3)$$

The allowable amount of special toner, such as transparent toner, is determined in the above manner.

After the total amount of toner of the C, M, Y, K, and CL (transparent toner) colors is determined, in Step S403, the CPU performs a gamma process optimal for the MFP 101 for each color.

In Step S404, the CPU performs an image formation process for each color. The image formation process can include screen processing and error diffusion.

In Step S405, the CPU prints out the image.

The printing method in which the fusing is performed once, as described above, is hereinafter referred to as the "normal print-out process".

Figure 6:
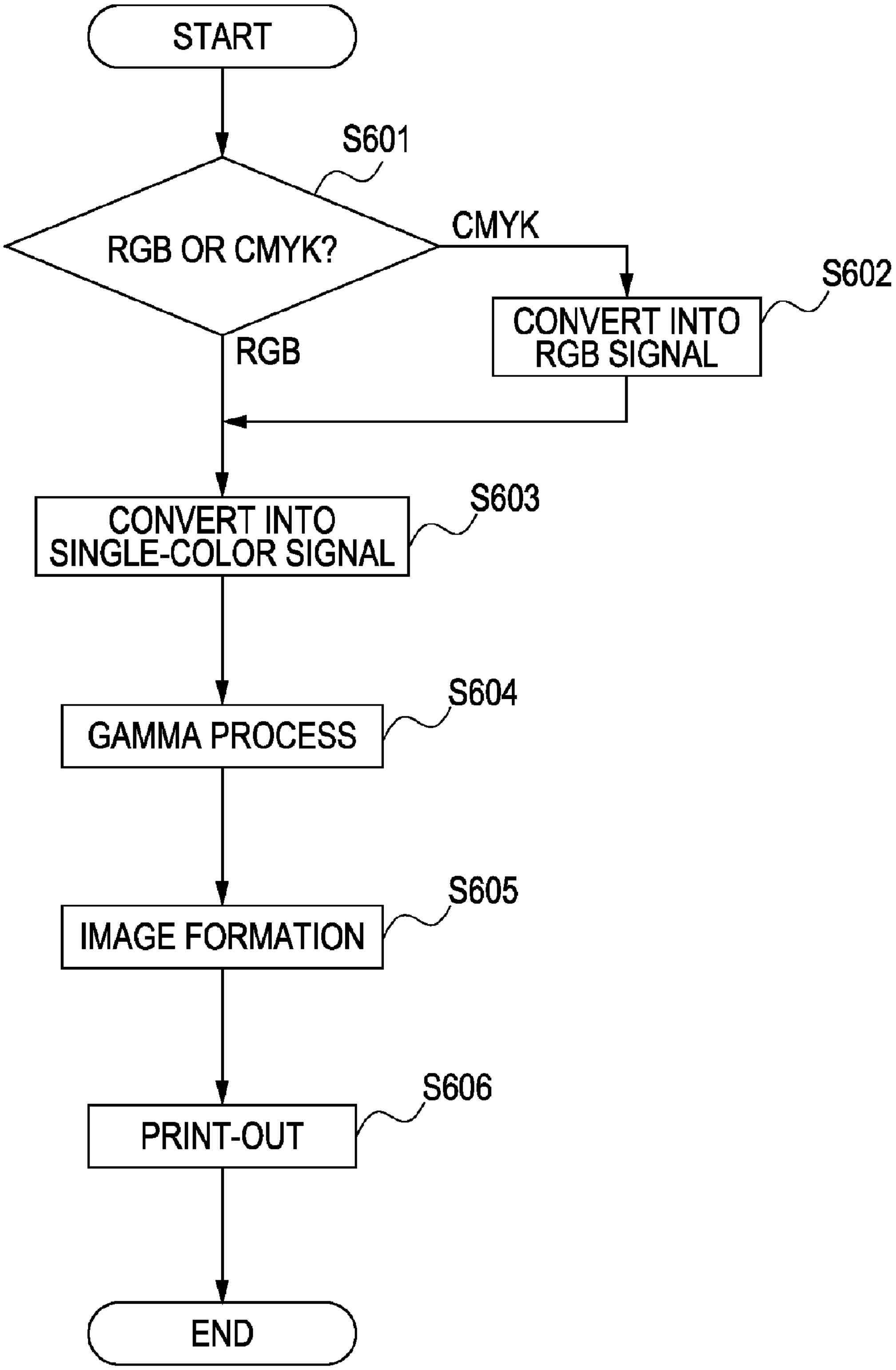
FIG. 6 is a flowchart illustrating an example of image processing in a two-path print-out process using the transparent toner.
Figure 7:
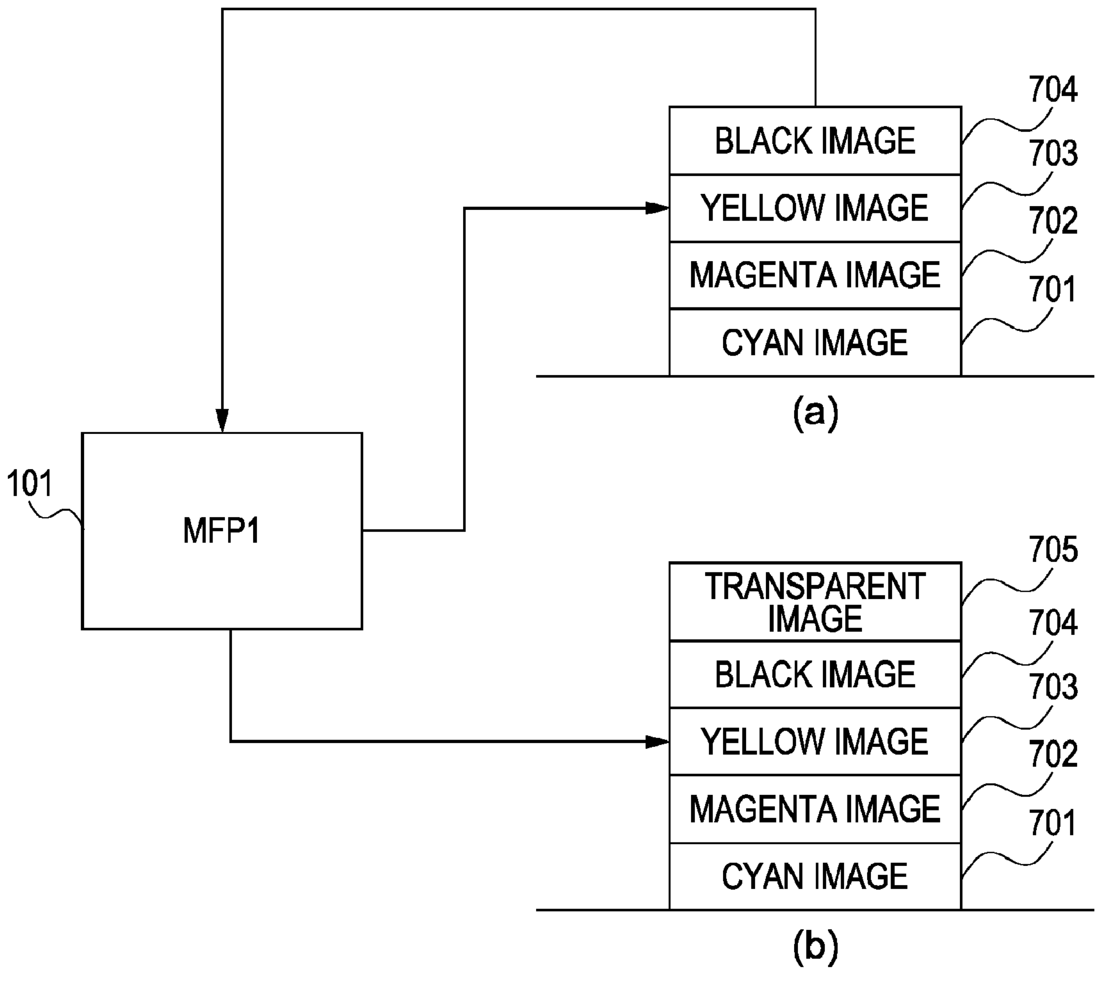
FIG. 7 schematically illustrates an example of how toner can be adhered in the two-path print-out process.

FIG. 6 is a flowchart illustrating an example of image processing in a two-path print-out process in the data processing unit 211. FIG. 7 schematically illustrates an example of how to generate a printout when the transparent toner is used. In this process, the transparent toner, which is the special toner, is adhered to a sheet of paper subjected to the process of adhering the toner of cyan, magenta, yellow, and black.

First, the MFP 101 sequentially performs printing of a cyan image 701, a magenta image 702, a yellow image 703, and a black image 704 to output the printed sheet, as shown in FIG. 7(*a*).

Next, the printed sheet including the cyan image 701, the magenta image 702, the yellow image 703, and the black image 704 is set in a paper feed cassette in the MFP 101.

A transparent image 705, which is a special-toner image, is printed on the printed sheet that is set in the paper feed cassette, as shown in FIG. 7(*b*).

The example of the process shown in the flowchart in FIG. 6 indicates an outline of adhesion of only the transparent toner and may be performed by the CPU provided in the image processing apparatus according to the embodiment of the present invention.

Referring to FIG. 6, in Step S601, the CPU determines whether an image signal input from the local PC 102 or the MFP 101 or 103 is an RGB signal or a CMYK signal. If the CPU determines that the input image signal is a CMYK signal (CMTK in Step S601), then processing proceeds to Step S602, where the CPU converts the CMYK signal into an RGB signal. If the CPU determines that the input signal is a RGB signal (RGB in Step S601), then processing proceeds to Step S602. The conversion into an RGB signal may be performed by, for example, a matrix operation as shown in Equation (4):

$$\begin{pmatrix} R \\ G \\ B \end{pmatrix} = \begin{pmatrix} B1 & B2 & B3 & B4 \\ B5 & B6 & B7 & B8 \\ B9 & B10 & B11 & B12 \end{pmatrix} \begin{pmatrix} C \\ M \\ Y \\ K \end{pmatrix} \quad (4)$$

In Step S603, the CPU converts the RGB signal into a single-color signal. The conversion into a single-color signal may be performed by, for example, an arithmetic expression that is not constant. Although the CMYK signal is converted in to the RGB signal that is then converted into the single-color signal, the CMYK signal may also be directly converted into the single-color signal by using a known method. In Step S604, the CPU performs the gamma process optimal for the MFP 101 for the transparent toner. In Step S605, the CPU performs the image formation process. In Step S606, the CPU prints out the image.

The printing method in which the fusing is performed again for the special toner described above is hereinafter referred to as the "two-path print-out process".

Figure 8:
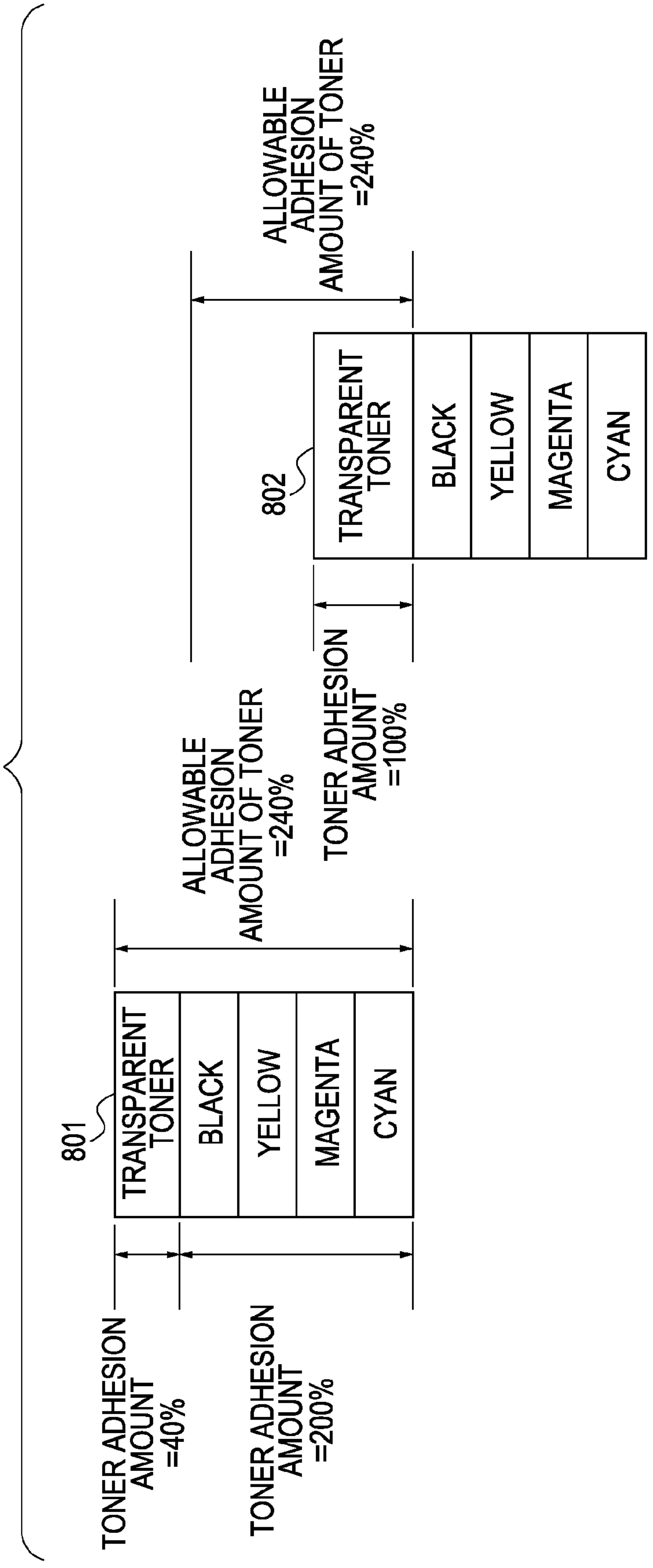
FIG. 8 schematically illustrates an example of the difference in the adhesion amount of transparent toner between the normal print-out process and the two-path print-out process.

FIG. 8 schematically illustrates an example of the difference in the adhesion amount of transparent toner on a printed sheet between in the normal print-out process and in the two-path print-out process.

It is assumed here that the allowable adhesion amount of toner in the MFP is equal to 240%. In the normal print-out process, since the total adhesion amount of toner of cyan, magenta, yellow, and black is 200%, the adhesion amount of transparent toner 801 is only 40% (240% (the allowable adhesion amount of toner in the MFP)−200%=40%).

In contrast, in the two-path print-out process, the print process is performed again on the printed sheet on which the cyan, magenta, yellow, and black toner images have been printed to adhere the transparent toner on the sheet.

Accordingly, the adhesion amount of transparent toner 802 is 100% in the print-out of the transparent-toner image. One hundred percent is the maximum toner adhesion amount for a single color.

Figure 9:
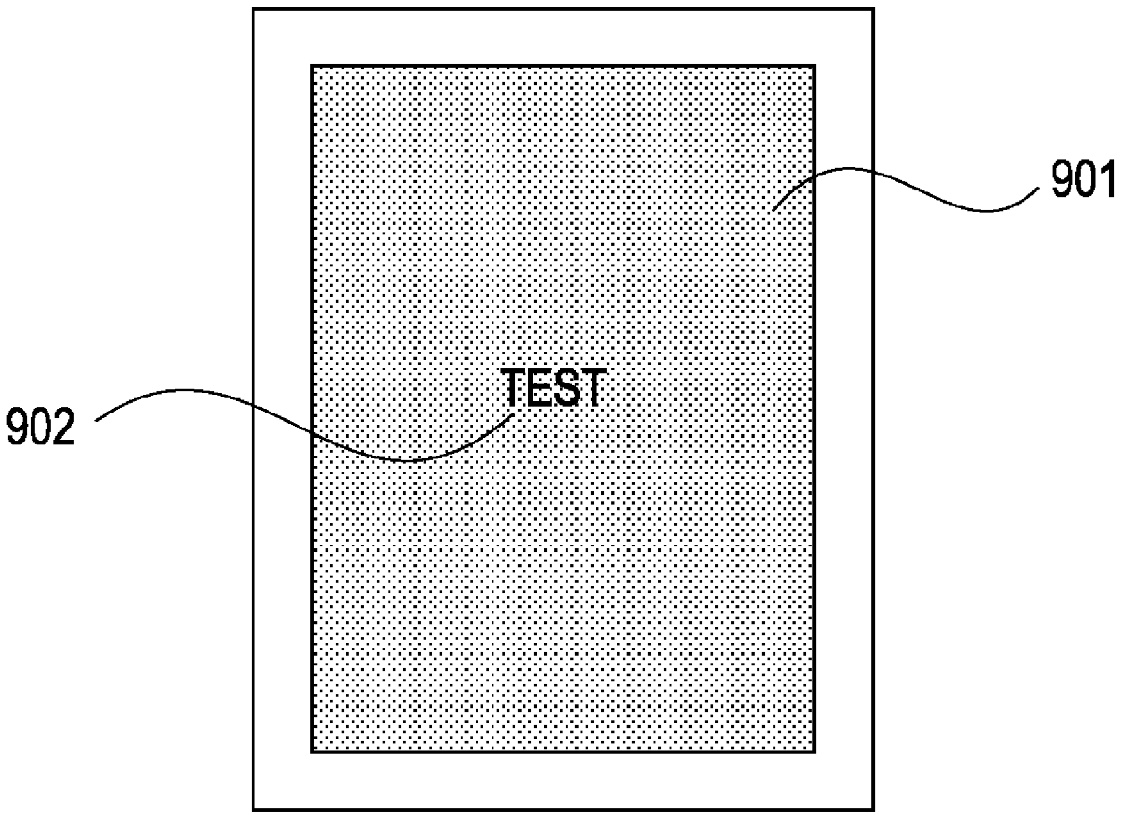
FIG. 9 illustrates an example of a sample of a printout using the transparent toner.

FIG. 9 illustrates a sample of a printout. In the sample in FIG. 9, the cyan, magenta, yellow, and black toner images are printed on a background 901 and the transparent-toner image is printed on only a part where a character string "test" 902 is written. The printing at a toner adhesion amount of 100% in the two-path print-out process has a visual effect larger than that of the printing at a toner adhesion amount of 40% in the normal print-out process.

Figure 10:
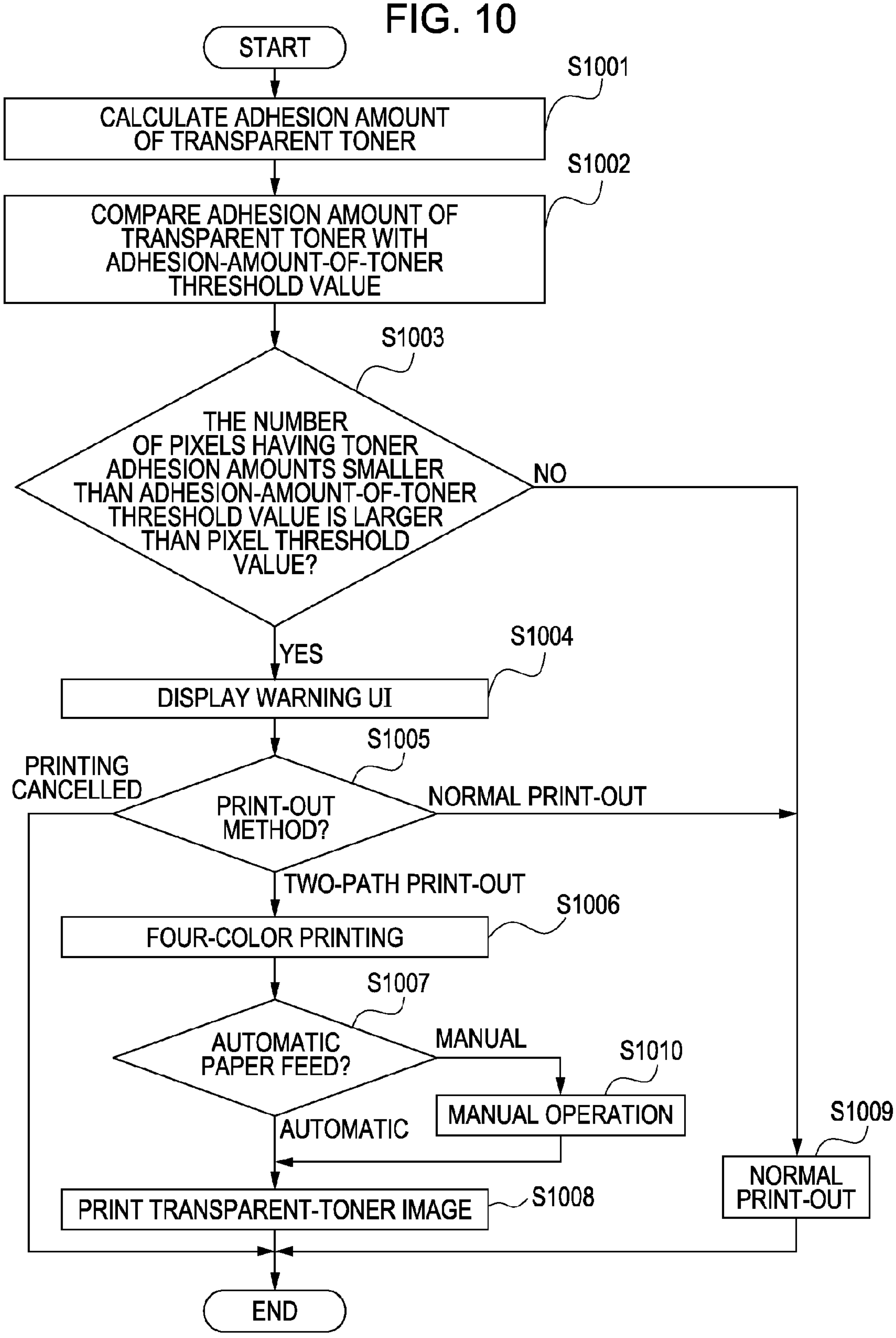
FIG. 10 is a flowchart showing an outline of an example of a process according to a first exemplary present exemplary embodiment.
Figure 11:
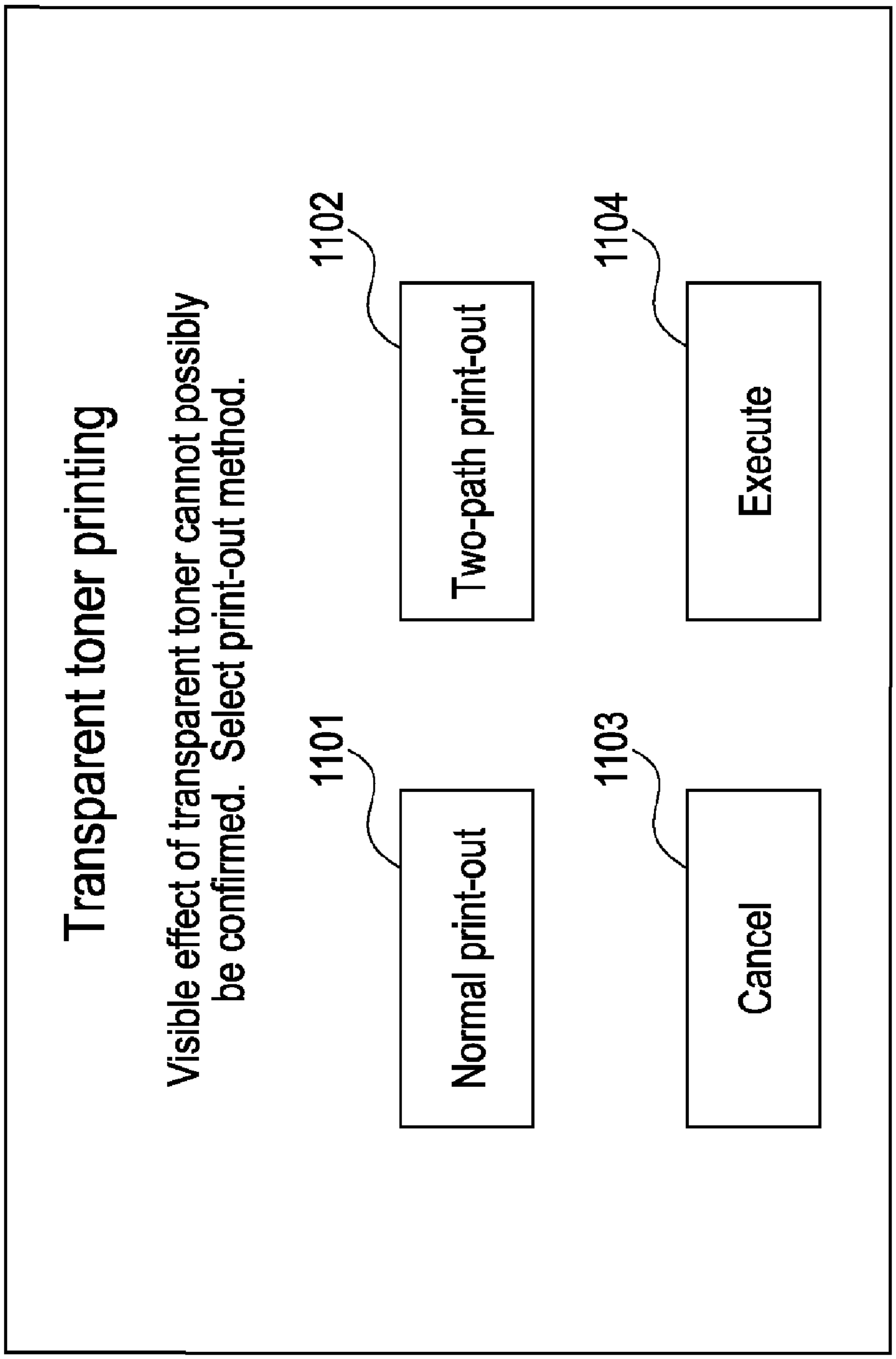
FIG. 11 illustrates an example of a screen displayed in a user interface of a local PC or a display unit of the MFP.

FIG. 10 is a flowchart showing an example of an automatic switching process featuring the normal print-out process and the two-path print-out process according to the present exemplary embodiment. FIG. 11 illustrates an example of a screen displayed in the user interface of the MFP.

The automatic switching process example shown in the flowchart in FIG. 10 may be performed by the CPU provided in the image processing apparatus according to the embodiment of the present invention.

When a user instructs the "normal print-out process" using the transparent toner from the MFP 101 or the local PC 102, then in Step S1001, the CPU calculates the adhesion amount of transparent toner.

In Step S1002, the CPU compares the adhesion amount of transparent toner with an adhesion-amount-of-toner threshold value that is set in the MFP 101 in advance. The adhesion-amount-of-toner threshold value indicates the threshold value of the toner adhesion amount for every pixel, which is sufficient to achieve the effect of the transparent toner in the printing of a transparent-toner image.

For example, the adhesion-amount-of-toner threshold value appropriate for achieving the effect of the transparent toner may be 50%.

The comparison in Step S1002 is performed for all the pixels of which the image is composed. The pixels are grouped into a first pixel group and a second pixel group on the basis of the adhesion-amount-of-toner threshold value. Specifically, the number of pixels (in the first pixel group) having the toner adhesion amounts smaller than the adhesion-amount-of-toner threshold value or the percentage of the area of such pixels to the whole image is stored. In other words, the percentage of the image area occupied by the pixels (in the first pixel group) determined to have the toner adhesion amounts smaller than the adhesion-amount-of-toner threshold value to the whole image is stored.

The whole image indicates the entire area of an image to be printed or the image area including the pixels for which the printing with the transparent toner is set. Specifically, when the printing with the transparent toner is set for the entire area of an image, the whole image indicates the entire area of the image to be printed. When the printing with the transparent toner is set for part of an image, the whole image indicates the image area including the pixels for which the printing with the transparent toner is set.

In Step S1003, the CPU compares the stored number of pixels having the toner adhesion amounts smaller than the adhesion-amount-of-toner threshold value or the percentage of the area of such pixels to the whole image with a pixel threshold value that is set in the MFP 101 in advance to determine whether the number or percentage is larger than the pixel threshold value.

The pixel threshold value indicates the threshold value for the number of pixels having the toner adhesion amounts smaller than the adhesion-amount-of-toner threshold value (50%) or for the percentage of the area of such pixels to the whole image.

For example, an appropriate pixel threshold value may be the number of pixels corresponding to 50% of the number of all the pixels or 50% of the area of the whole image.

If the number of pixels having the toner adhesion amounts that do not exceed the adhesion-amount-of-toner threshold value (50%) exceeds the pixel threshold value (the number of pixels corresponding to 50% of the number of all the pixels), the adhesion amount of transparent toner may be decreased on the whole image to reduce the gloss, which is the visual effect of the transparent toner.

Similarly, if the percentage of the area of the pixels having the toner adhesion amounts smaller than the adhesion-amount-of-toner threshold value (50%) to the whole image is larger than the pixel threshold value (50% of the area of the whole image), the adhesion amount of transparent toner may be decreased on the whole image to reduce the gloss, which is the visual effect of the transparent toner. In other words, the visual effect of the transparent toner is reduced if the area of the pixels having the toner adhesion amounts smaller than the adhesion-amount-of-toner threshold value occupy a higher percentage of the whole image.

If the CPU determines in Step S1003 that the percentage of the area of the pixels having the toner adhesion amounts smaller than the adhesion-amount-of-toner threshold value to the whole image is smaller than the pixel threshold value (NO in Step S1003), then processing proceeds to Step S1009, where the CPU performs the normal print-out process and, then, the process is terminated.

If the CPU determines in Step S1003 that the percentage of the area of the pixels having the toner adhesion amounts smaller than the adhesion-amount-of-toner threshold value to the whole image is larger than the pixel threshold value (YES in Step S1003), the process may go to Step S1006 to automatically perform the two-path print-out process. Alternatively, the process may go to Step S1004 as in the process illustrated in FIG. 10, in which the CPU displays a screen where a print-out method can be selected in the user interface. Accordingly, the selection of the print-out method may be based on the pixel threshold value.

FIG. 11 illustrates an example of the screen displayed in Step S1004. A warning that the visual effect of the transparent toner is small is displayed in the screen in FIG. 11.

The warning screen in FIG. 11 may be displayed when the user selects the two-path print-out in Step S1005. The user selects a print-out method in accordance with the user interface to instruct the subsequent print-out method. When the user presses a "Normal print-out" button 1101 and then presses an "Execute" button 1104, in Step S1005 (NORMAL PRINT-OUT in Step S1005), the CPU selects the normal print-out, and processing proceeds to Step S1009. In Step S1009, the CPU performs the normal print-out process and, then, the process is terminated. When the user presses a "Cancel" button 1103, in Step S1005 (PRINTING CANCELLED in Step S1005), the CPU cancels the print-out instruction and, then, the process is terminated without printing. When the user presses a "Two-path print-out" button 1102 and then presses the "Execute" button 1104, in Step S1005 (TWO-PATH PRINT-OUT in Step S1005), the CPU selects the two-path print-out, and processing proceeds to Step S1006. When the two-path print-out is selected, in Step S1006, the MFP 101 performs the four-color printing with the cyan, magenta, yellow, and black toner. In Step S1007, the CPU determines whether automatic paper feed is selected. If the CPU determines that the automatic paper feed is selected (AUTOMATIC in step S1007), processing proceeds to Step S1008 and the printed sheet subjected to the fusing and printing with the toner of the four colors is automatically set in the paper feed cassette again without being ejected from an ejecting mechanism of the MFP 101. In order to automatically set the printed sheet in the paper feed cassette, for example, the printed sheet may be set in the paper feed cassette again without being inverted in an inversion path used in duplex printing.

In Step S1008, the CPU transfers only the transparent-toner image to the printed sheet subjected the four-color printing and fuses the transparent-toner image to print the transparent-toner image and, then, the process is terminated. If the CPU determines in Step S1007 that manual paper feed is selected (MANUAL in step S1007), processing proceeds to step S1010, and the printed sheet subjected to the printing with the toner of the four colors is ejected from the ejecting mechanism of the MFP 101. In Step S1010, the user sets the printed sheet in the paper feed cassette of the MFP 101. Processing then proceeds to Step S1008, where only the transparent-toner image is generated on the printed sheet to print the transparent-toner image and, then, the process is terminated.

According to the first exemplary embodiment of the present invention, it may be possible to adhere the special toner on the printout while avoiding a reduction in the visual effect of the transparent toner due to the restriction on the toner adhesion amount.

When multiple copies of the same image are to be printed, the first copy may be printed in the one-path print-out process and a user interface with which the user selects the normal print-out process or the two-path print-out process for the second and subsequent copies may be displayed before outputting the second copy.

This may allow the user to select the print-out method for the second and subsequent copies after the user confirms the appearance of the first copy.

The adhesion-amount-of-toner threshold value is constantly set to 50% in the first exemplary embodiment. In contrast, the user can vary the adhesion-amount-of-toner threshold value in a second exemplary embodiment of the present invention. An example of the second exemplary embodiment will now be described. The adhesion-amount-of-toner threshold value may be varied by the user before the image processing in the first exemplary embodiment is performed.

Figure 12:
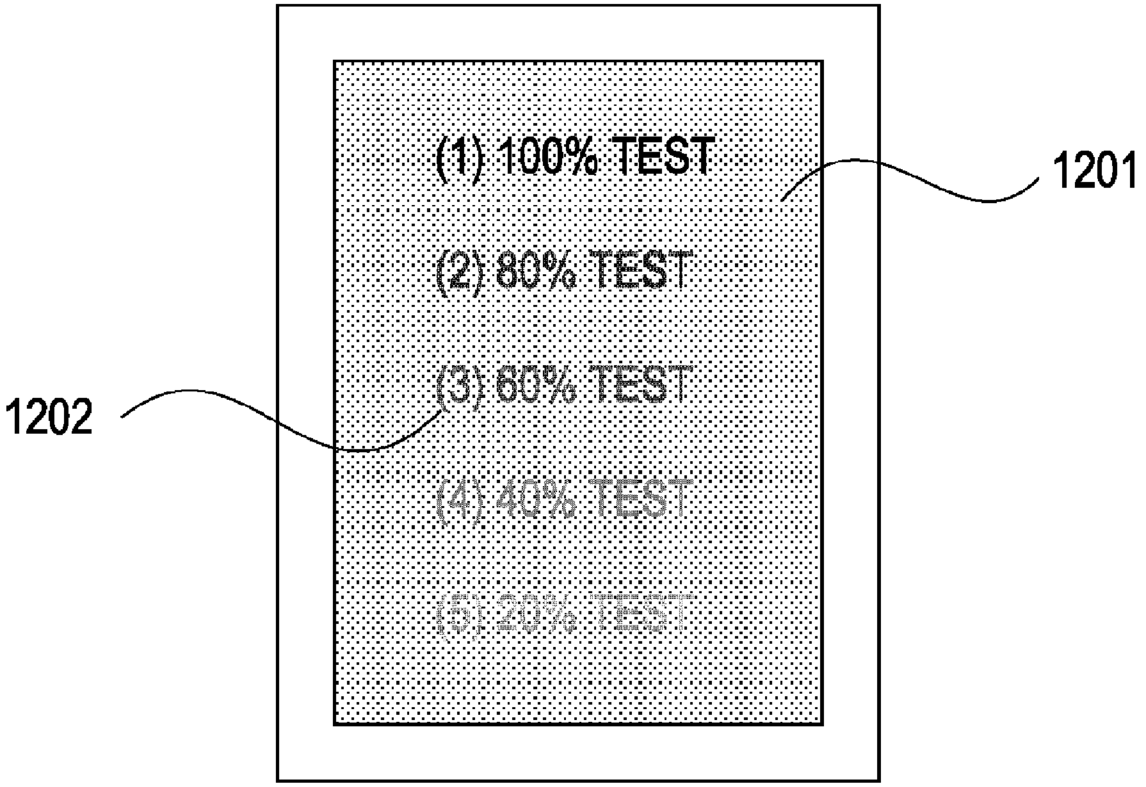
FIG. 12 illustrates an example of a test printout used for confirming the visibility of the adhesion amount of transparent toner.
Figure 13:
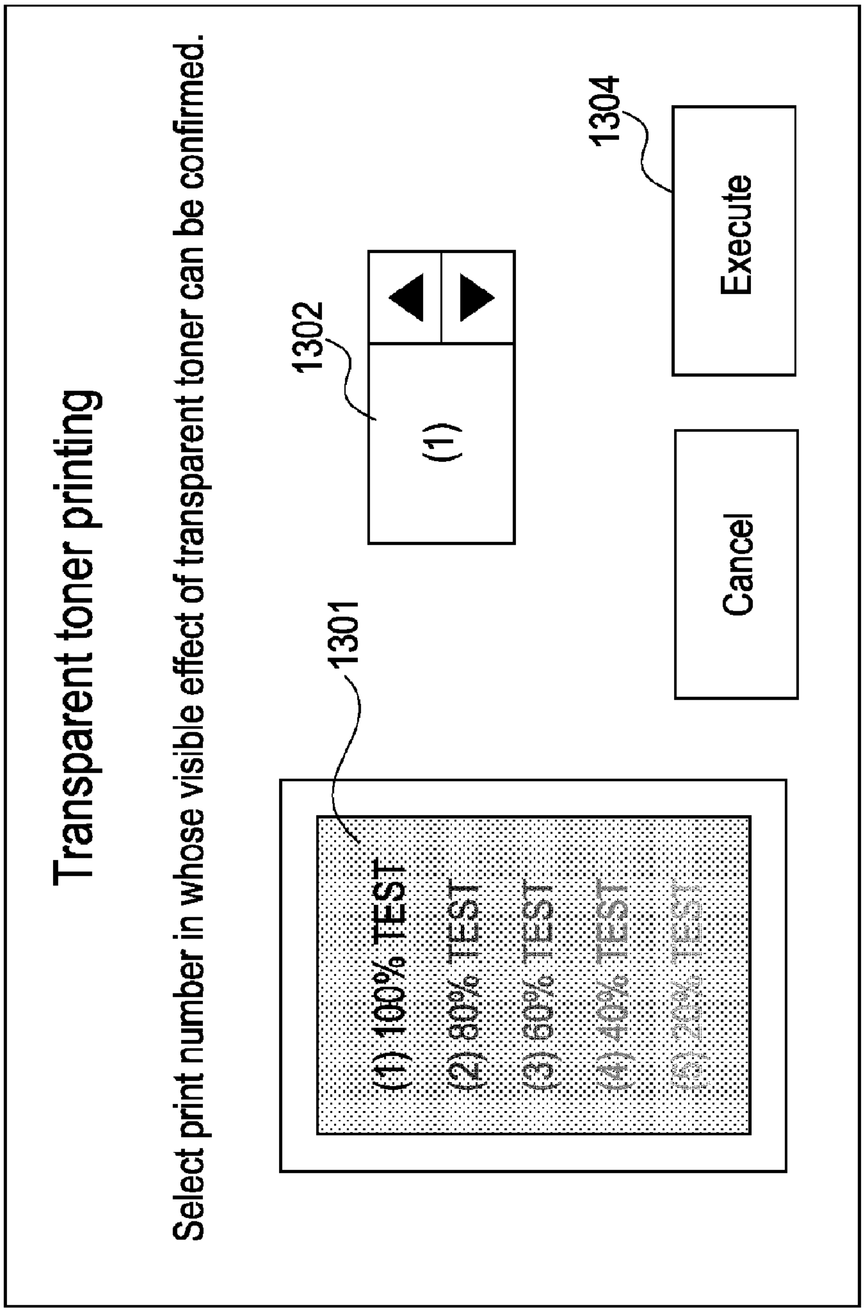
FIG. 13 illustrates an example of another screen displayed in the user interface of the local PC or the display unit of the MFP.

FIG. 12 illustrates an example of a test printout used in the setting of the adhesion-amount-of-toner threshold value. FIG. 13 illustrates an example of a screen displayed in the user interface of the MFP.

When the user performs test printing of the transparent toner for the MFP 101, the printed sheet illustrated in the example shown in FIG. 12 may be output by the normal print-out process. Referring to the example shown in FIG. 12, the cyan, magenta, yellow, and black toner images are printed in an area 1201 on the printed sheet so that the total adhesion amount of the cyan, magenta, yellow, and black toner becomes around 140%. Character strings 1202 are printed on the area 1201. The transparent toner can be used in the printing of the character strings 1201. Specifically, according to this example the character string (1) is printed with an adhesion amount of transparent toner that is equal to 100%, the character string (2) is printed with an adhesion amount of transparent toner that is equal to 80%, the character string (3) is printed with an adhesion amount of transparent toner that is equal to 60%, the character string (3) is printed with an adhesion amount of transparent toner that is equal to 40%, and the character string (3) is printed with an adhesion amount of transparent toner that is equal to 20%. The user views the result of the printing on this printout to determine which character string, among the character strings (1) to (5) having different densities of the transparent toner, achieves the predetermined visual effect.

The user can input the result of the determination with the screen in FIG. 13 displayed in the user interface.

Referring to the example of the screen shown in FIG. 13, a preview of the printout is displayed in an area 1301. The user may select one of the character strings (1) to (5) in the area 1301 with a button 1302.

When the user presses an "Execute" button 1304 after the selection, the CPU provided in the image processing apparatus accepts the selected adhesion amount of transparent toner as the adhesion-amount-of-toner threshold value. The CPU sets this value as a new adhesion-amount-of-toner threshold value and uses the set adhesion-amount-of-toner threshold value in Step S1002.

The operation according to the steps subsequent to Step S1002 may be performed in the manner described above in the first exemplary embodiment by using the adhesion-amount-of-toner threshold value set in the above manner. For example, since the adhesion-amount-of-toner threshold value is equal to 20% if the character string (5) is selected, the number of pixels having the adhesion amounts of transparent toner smaller than 20% is counted.

According to the second exemplary embodiment of the present invention, the user can set the adhesion-amount-of-toner threshold value, so that it is possible to adhere the special toner in accordance with a request from the user.

The pixel threshold value, which indicates the percentage of the area of pixels having the toner adhesion amounts smaller than the adhesion-amount-of-toner threshold value to the whole image, is constantly set to 50% in the first exemplary embodiment. In contrast, the user can vary the pixel threshold value in a third exemplary embodiment of the present invention. An example of the third exemplary embodiment will now be described.

Figure 14:
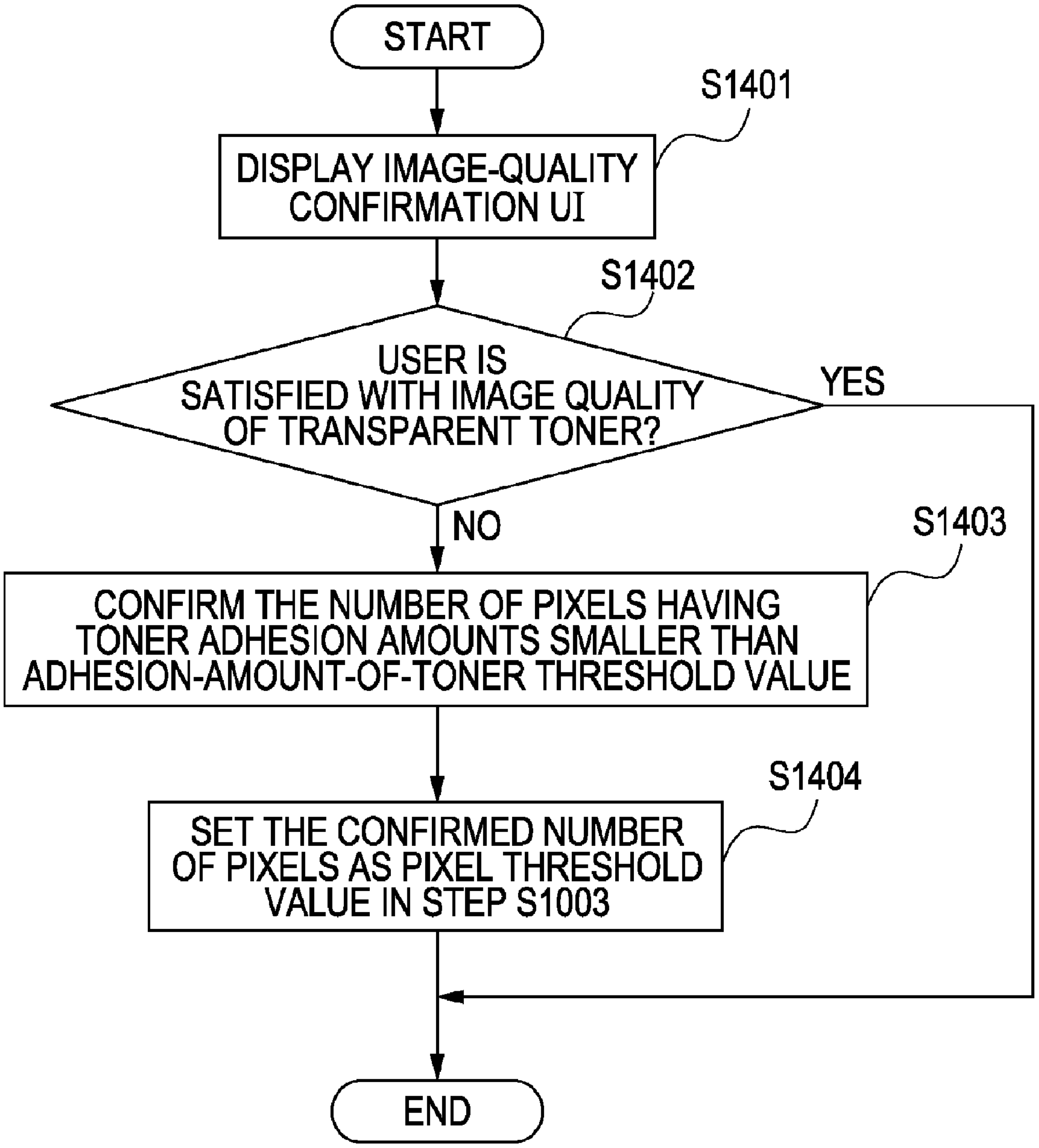
FIG. 14 is a flowchart showing an outline of an example of a process according to a second exemplary present exemplary embodiment.

FIG. 14 is a flowchart showing an example of a process of setting the pixel threshold value according to the third exemplary embodiment. After the user prints the transparent-toner image by the normal print-out process and the printed sheet is output, then in Step S1401, a screen used for confirming the image quality may be displayed in the user interface. In Step S1402, it is determined whether the user is satisfied with the visual effect of the transparent toner on the printed sheet displayed in the screen. If it is determined that the user is satisfied with the visual effect of the transparent toner (YES in Step S1402), nothing is performed and the process is terminated. If it is determined that the user is not satisfied with the visual effect of the transparent toner (NO in Step S1402), then processing proceeds to Step S1403, where the number of pixels having the toner adhesion amounts smaller than the counted adhesion-amount-of-toner threshold value or the percentage of the area of such pixels to the whole image is confirmed. In Step S1404, the number of pixels having the toner adhesion amounts smaller than the number of pixels confirmed in Step S1403 or the percentage of the area of such pixels to the whole image confirmed in Step S1403 is set as the pixel threshold value used in Step S1003. The pixel threshold value that is newly set is used in Step S1003 in the subsequent print-out process.

The operation according to the steps subsequent to Step S1003 may be performed in the manner described above in the first exemplary embodiment by using the pixel threshold value set in the above manner.

According to the third exemplary embodiment of the present invention, the user can set the pixel threshold value, so that it is possible to adhere the special toner in accordance with a request from the user.

A fourth exemplary embodiment of the present invention concerns a process of automatically switching between the normal print-out process and the two-path print-out process when an input image includes multiple pages.

Figure 15:
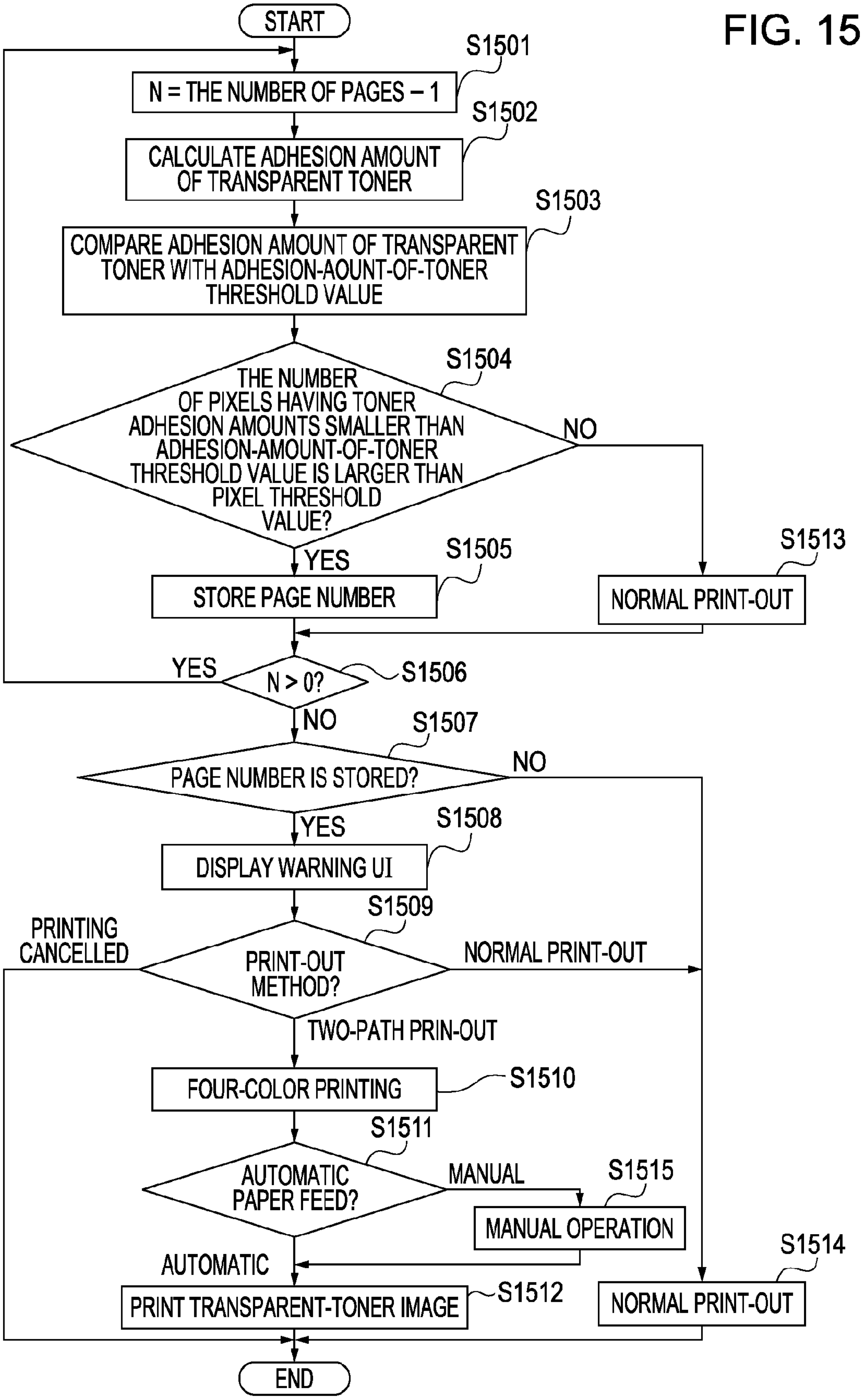
FIG. 15 is a flowchart showing an outline of an example of a process according to a third exemplary present exemplary embodiment.

FIG. 15 is a flowchart showing an example of the automatic switching process.

The flowchart in FIG. 15 may be performed by the CPU provided in the image processing apparatus according to the embodiment of the present invention.

When the user instructs the "normal print-out process" using the transparent toner from the MFP 101 or the local PC 102, in Step S1501, the CPU subtracts one from the number of pages in an input image and stores the value resulting from the subtraction as "N". In Step S1502, the CPU calculates the adhesion amount of transparent toner in the first page.

In Step S1503, the CPU compares the calculated adhesion amount of transparent toner with the adhesion-amount-of-toner threshold value set in the MFP 101 in advance.

The comparison in Step S1503 is performed for all the pixels in the input image, and the number of pixels having the toner adhesion amounts smaller than the adhesion-amount-of-toner threshold value is stored.

In Step S1504, the CPU compares the stored number of pixels with the pixel threshold value set in the MFP 101 in advance.

If the comparison shows that the number of pixels having the toner adhesion amounts smaller than the adhesion-amount-of-toner threshold value is smaller than the pixel threshold value (NO in Step S1504), then processing proceeds to Step S1513, where the CPU performs the normal print-out process to complete the printing of the corresponding page. Processing then proceeds to Step S1506, where the CPU determines whether the subsequent page exists.

If the comparison shows that the number of pixels having the toner adhesion amounts smaller than the adhesion-amount-of-toner threshold value is larger than the pixel threshold value (YES in Step S1504), then processing proceeds to Step S1505, where the CPU stores the corresponding page number.

In Step S1506, the CPU determines whether the subsequent page exists. If the CPU determines that the subsequent page exists (YES in Step S1506), the process goes back to Step S1501 to repeat the above steps.

If the CPU determines in Step S1506 that the subsequent page does not exist (NO in Step S1506), then processing proceeds to Step S1507, where the CPU determines whether the page number stored in Step S1505 exists. If the CPU determines in Step S1507 that the page number stored in Step S1505 does not exist (NO in Step S1507), then processing proceeds to Step S1514, where the CPU performs the normal print-out process. If the CPU determines in Step S1507 that the page number stored in Step S1505 exists (YES in Step S1507), then processing proceeds to Step S1508, and a screen such as that shown in the example of FIG. 16 is displayed in the user interface.

Figure 16:
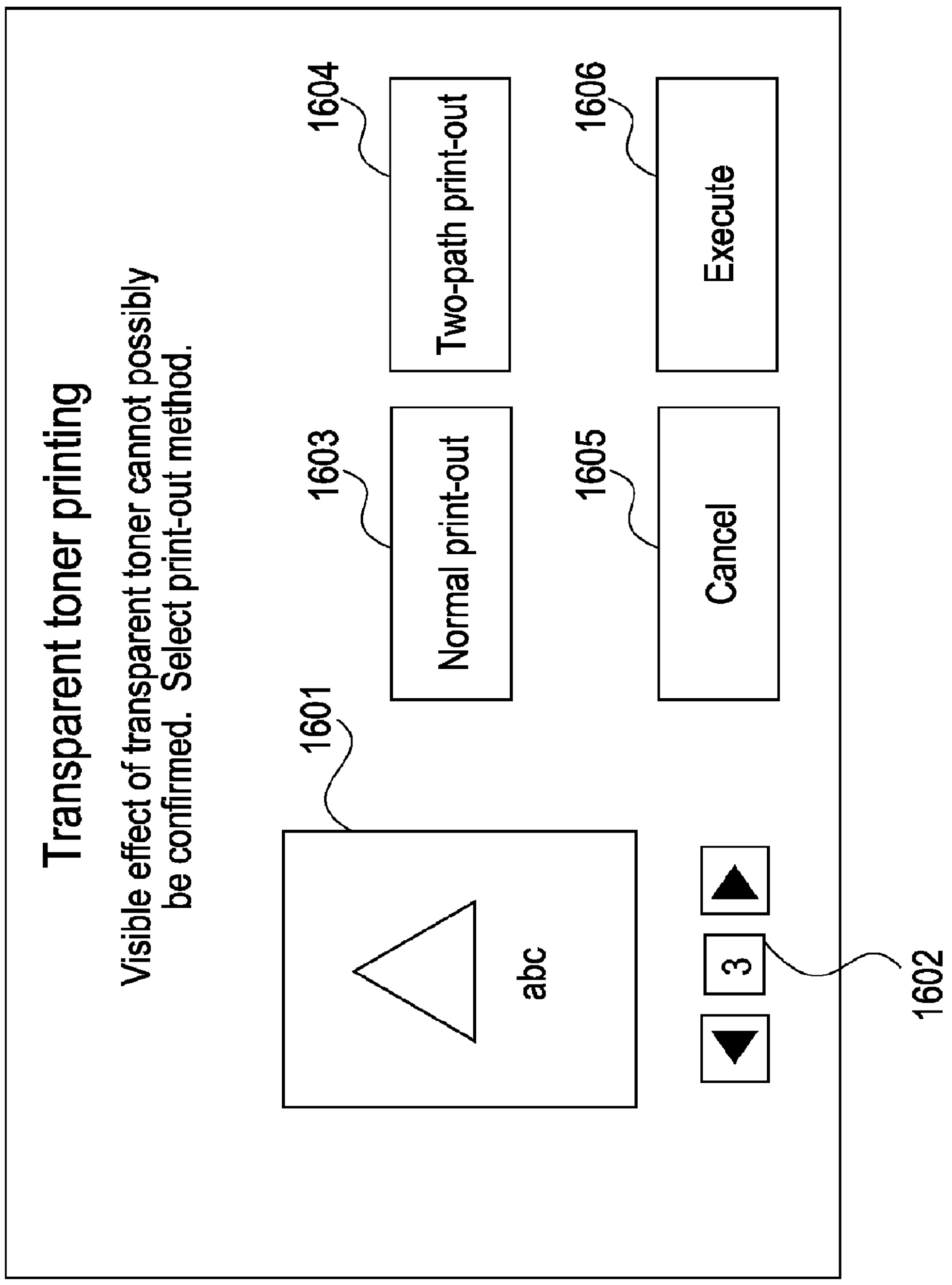
FIG. 16 illustrates an example of another screen displayed in the user interface of the local PC or the display unit of the MFP.

With the screen shown in the example of FIG. 16, the previews of all the pages to be determined to have lower visual effects of the transparent toner can be displayed in an area 1601. A direction button in an area 1602 can be pressed to switch the page that is displayed. The user uses the buttons displayed in the screen in FIG. 16 to determine how to perform the printing with the transparent toner for all the pages that are stored.

Specifically, when the user presses a "Normal print-out" button 1603 and then an "Execute" button 1606, in Step S1509 (NORMAL PRINT-OUT in Step S1509), the CPU selects the normal print-out, and processing proceeds to Step S1514. In Step S1514, the CPU performs the normal print-out process to print all the pages.

When the user presses a "Two-path print-out" button 1604 and then the "Execute" button 1606, in Step S1509 (TWO-PATH PRINT-OUT in Step S1509), the CPU selects the two-path print-out and processing proceeds to step S1510. In Step S1510, the MFP 101 performs the four-color printing with the cyan, magenta, yellow, and black toner.

In Step S1511, the CPU determines whether the automatic paper feed is selected. If the CPU determines that the automatic paper feed is selected (AUTOMATIC in Step S1511), the printed sheet subjected to the four-color printing is automatically set in the paper feed cassette again without being ejected from the ejecting mechanism of the MFP 101.

In order to automatically set the printed sheet in the paper feed cassette, for example, the printed sheet may be set in the paper feed cassette again without being inverted in the inversion path used in duplex printing.

In Step S1512, the CPU transfers only the transparent-toner image to the printed sheet subjected the four-color printing and fuses the transparent-toner image to print the transparent-toner image. Then, the process is terminated.

If the CPU determines in Step S1511 that the manual paper feed is selected (MANUAL in Step S1511), the printed sheet subjected to the four-color printing is ejected from the ejecting mechanism of the MFP 101. In Step S1515, the user sets the printed sheet in the paper feed cassette of the MFP 101. In Step S1512, the CPU generates only the transparent-toner image on the printed sheet to print the transparent-toner image. Then, the process is terminated. When the user presses a "Cancel" button 1605 in FIG. 16 (PRINTING CANCELLED in Step S1509), the printing is cancelled and the process is terminated.

According to the fourth exemplary embodiment of the present invention, even in the case of an image including multiple pages, it is possible to adhere the special toner on the printout of each page while avoiding a reduction in the intended visual effect of the transparent toner due to the restriction on the toner adhesion amount.

The first through fourth exemplary embodiments of the present invention may also make it possible to switch to a print-out process allowing the toner adhesion amount to be increased if the visibility is reduced due to a smaller adhesion amount of transparent toner when a user attempts printing with the transparent toner. This can prevent the visibility of the transparent toner from being reduced.

Aspects of the present invention can include supplying a computer-readable recording medium including a program and/or computer-executable instructions that operate one or more of the configurations described above so as to realize functions according to the above embodiments, to a computer that reads out and executes the program code and/or computer-executable instructions stored in the recording medium. In this case, aspects of the present invention may include the recording medium storing the program and/or computer-executable instructions itself.

The recording medium may be, for example, at least one of a flexible disk, a hard disk, an optical disk, a magneto-optical disk, a compact disk-read only memory (CD-ROM), a magnetic tape, a nonvolatile memory card, and a read only memory (ROM).

According to aspects of the present invention, the program and/or computer-executable instructions recorded on the recording medium may perform processing by itself, as well as with the operating system (OS) in cooperation with another software or expansion board to perform functions according to the above exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-115736 filed Apr. 25, 2008, which is hereby incorporated by reference herein in its entirety.

What is claimed is:

1. An image processing apparatus comprising:

an allowable-amount-of-special-toner determining unit configured to determine an allowable amount of special toner from a total adhesion amount of toner of four colors including cyan, magenta, yellow, and black on an input image, the total adhesion amount of toner of four colors being calculated in formation of an image;

a normal print-out unit configured to perform a normal print-out process in which the toner of the four colors including cyan, magenta, yellow and black and the special toner are adhered and fused;

a two-path print-out unit configured to perform a two-path print-out process in which the special toner is adhered and fused after the toner of the four colors including cyan, magenta, yellow and black is adhered and fused;

a grouping unit configured to group pixels for which printing with the special toner is set into a first pixel group and a second pixel group based on the allowable amount of special toner determined by the allowable-amount-of-special-toner determining unit; and a print-out-method selecting unit configured to select the normal print-out unit or the two-path print-out unit based on a percentage of the number of pixels grouped into the first pixel group by the grouping unit to the number of pixels for which printing with the special toner is set.

2. The image processing apparatus according to claim 1, wherein the first pixel group includes pixels having adhesion amounts of special toner for each pixel smaller than a predetermined adhesion-amount-of-toner threshold value, and wherein the second pixel group includes pixels having adhesion amounts of special toner for each pixel larger than the predetermined adhesion-amount-of-toner threshold value.

3. The image processing apparatus according to claim 1, wherein the print-out-method selecting unit selects the two-path print-out unit if the number of pixels in the first pixel group is larger than a predetermined pixel threshold value indicating the percentage of the number of pixels in the first pixel group to the number of pixels for which printing with the special toner is set.

4. The image processing apparatus according to claim 1, further comprising:

an adhesion-amount-of-toner threshold-value setting unit configured to receive a density of the special toner whose visual effect is confirmed by a user from multiple printouts to which special toner of different densities is adhered as the adhesion-amount-of-toner threshold value.

5. The image processing apparatus according to claim 3, further comprising:

a pixel-threshold-value setting unit configured to receive a value smaller than the predetermined pixel threshold value as a new pixel threshold value if the user confirms no visual effect of the special toner on the multiple printouts.

6. The image processing apparatus according to claim 1, wherein the selection by the print-out-method selecting unit is performed for every page if the input image includes multiple pages, and the two-path print-out process is performed when all the pages for which the two-path print-out process is performed have been determined.

7. The image processing apparatus according to claim 1, wherein a display screen used for warning a user that the two-path print-out process is performed is generated.

8. The image processing apparatus according to claim 1, wherein a display screen used for warning a user that the two-path print-out process is performed is generated if the two-path print-out process is selected by the print-out-method selecting unit.

9. The image processing apparatus according to claim 1, further comprising:

a unit configured to output a first page by the normal print-out unit when the input image includes multiple pages and to generate a display screen with which a user selects the normal print-out unit or the two-path print-out unit before a second page is printed.

10. The image processing apparatus according to claim 1, wherein the special toner is transparent toner.

11. An image processing method comprising:

determining an allowable amount of special toner from a total adhesion amount of toner of four colors including cyan, magenta, yellow, and black on an input image, the total adhesion amount of toner of four colors being calculated in formation of an image;

performing a normal print-out process in which the toner of the four colors including cyan, magenta, yellow and black and the special toner are adhered and fused;

performing a two-path print-out process in which the special toner is adhered and fused after the toner of the four colors including cyan, magenta, yellow and black is adhered and fused;

grouping pixels for which printing with the special toner is set into a first pixel group and a second pixel group based on the determined allowable amount of special toner; and selecting the normal print-out process or the two-path print-out process based on a percentage of the number of pixels grouped into the first pixel group to the number of pixels for which printing with the special toner is set.

12. The image processing method according to claim 11, wherein the first pixel group includes pixels having adhesion amounts of special toner for each pixel smaller than a predetermined adhesion-amount-of-toner threshold value, and wherein the second pixel group includes pixels having adhesion amounts of special toner for each pixel larger than the predetermined adhesion-amount-of-toner threshold value.

13. The image processing method according to claim 11, wherein the two-path print-out process is selected if the number of pixels in the first pixel group is larger than a predetermined pixel threshold value indicating the percentage of the number of pixels in the first pixel group to the number of pixels for which printing with the special toner is set.

14. The image processing method according to claim 11, further comprising:

receiving a density of the special toner whose visual effect is confirmed by a user from multiple printouts to which special toner of different densities is adhered as the adhesion-amount-of-toner threshold value.

15. The image processing method according to claim 13, further comprising:

receiving a value smaller than the predetermined pixel threshold value as a new pixel threshold value if the user confirms no visual effect of the special toner on the multiple printouts.

16. The image processing method according to claim 11, wherein the selection of the print-out method is performed for every page if the input image includes multiple pages, and the two-path print-out process is performed when all the pages for which the two-path print-out process is performed have been determined.

17. The image processing method according to claim 11, wherein a display screen used for warning a user that the two-path print-out process is performed is generated.

18. The image processing method according to claim 11, wherein a display screen used for warning a user that the two-path print-out process is performed is generated if the two-path print-out process is selected.

19. The image processing method according to claim 11, further comprising:

outputting a first page by the normal print-out process when the input image includes multiple pages and generating a display screen with which a user selects the normal print-out process or the two-path print-out process before a second page is printed.

20. The image processing method according to claim 11, wherein the special toner is transparent toner.

21. A non-transitory computer-readable recording medium having computer-readable instructions stored thereon for causing an image processing apparatus to perform an image processing method, the non-transitory computer-readable recording medium comprising:

computer-executable instructions for determining an allowable amount of special toner from a total adhesion amount of toner of four colors including cyan, magenta, yellow, and black on an input image, the total adhesion amount of toner of four colors being calculated in formation of an image;

computer-executable instructions for performing a normal print-out process in which the toner of the four colors including cyan, magenta, yellow and black and the special toner are adhered and fused;

computer-executable instructions for performing a two-path print-out process in which the special toner is adhered and fused after the toner of the four colors including cyan, magenta, yellow and black is adhered and fused;

computer-executable instructions for grouping pixels for which printing with the special toner is set into a first pixel group and a second pixel group based on the determined allowable amount of special toner; and computer-executable instructions for selecting the normal print-out process or the two-path print-out process based on a percentage of the number of pixels grouped into the first pixel group to the number of pixels for which printing with the special toner is set.

* * * * *